United States Patent
Hahn et al.

(10) Patent No.: US 7,095,446 B2
(45) Date of Patent: Aug. 22, 2006

(54) METHOD AND DEVICE FOR PHASE CORRECTION OF A VERTICALLY DISTORTED DIGITAL IMAGE

(75) Inventors: Mirko Hahn, Munich (DE); Guenter Scheffler, Munich (DE); Dirk Wendel, Munich (DE)

(73) Assignee: Micronas GmbH, Freiburg (DE)

( * ) Notice: Subject to any disclaimer, the term of this patent is extended or adjusted under 35 U.S.C. 154(b) by 466 days.

(21) Appl. No.: 10/048,730

(22) PCT Filed: May 25, 2001

(86) PCT No.: PCT/EP01/05987

§ 371 (c)(1),
(2), (4) Date: May 7, 2002

(87) PCT Pub. No.: WO01/93569

PCT Pub. Date: Dec. 6, 2001

(65) Prior Publication Data

US 2002/0176021 A1   Nov. 28, 2002

(30) Foreign Application Priority Data

May 30, 2000  (DE)  ................... 100 26 739

(51) Int. Cl.
*H03L 7/00*  (2006.01)

(52) U.S. Cl. ................. 348/547; 348/536; 348/459; 348/513

(58) Field of Classification Search ................. 348/536, 348/547, 448, 449, 458, 513, 459

See application file for complete search history.

(56) References Cited

U.S. PATENT DOCUMENTS

| | | | |
|---|---|---|---|
| 4,658,293 A * | 4/1987 | Arai et al. | 348/448 |
| 5,089,893 A | 2/1992 | Iwase | 358/180 |
| 5,181,115 A * | 1/1993 | Flamm et al. | 348/537 |
| 5,283,651 A | 2/1994 | Ishizuka | 348/704 |
| 5,532,742 A * | 7/1996 | Kusaka et al. | 348/264 |
| 5,534,934 A | 7/1996 | Katsumata et al. | 348/445 |
| 5,574,508 A | 11/1996 | Diamont | 348/511 |
| 5,621,870 A | 4/1997 | Shyu et al. | 395/139 |

OTHER PUBLICATIONS

Schroeder et al. "Mehrdimensionale Signalverabeitung" Bd. 2: Architekturen und Anwendungen für Bilder und Bildsequenzen, Issued Jan. 28, 2000, Chapter 7.

English language copy of German Office Action for German Patent Appln. No. DE 100 26 739.4, Jul. 15, 2005.

* cited by examiner

Primary Examiner—Michael H. Lee
(74) Attorney, Agent, or Firm—O'Shea, Getz & Kosakowski, P.C.

(57) ABSTRACT

A device for correcting the phase of a vertically distorted digital picture receives picture data and a vertical phase correction signal, and assigns lines of the digital picture to a first half picture and to a second half picture. The lines of the second half picture are phase corrected with respect to the first half picture and the first and second half pictures are displayed sequentially. The phase correction is determined in response an increment signal that describes the change of an imaging factor in the veritcal direction of the digital picture on a line-by-line basis and a picture position signal indicative of whether the first half picture or the second half picture is being output.

18 Claims, 3 Drawing Sheets

METHOD AND DEVICE FOR PHASE CORRECTION OF A VERTICALLY DISTORTED DIGITAL IMAGE

PRIORITY INFORMATION

This application claims priority from international application PCT/EP01/05987, which claims priority from DE 100 26 739.4 filed May 30, 2000.

BACKGROUND OF THE INVENTION

The present invention relates to the field of video image processing, and in particular to correcting the phase of a vertically distorted digital picture, such as a digital television picture.

Television signals are often displayed using interlaced scanning. As is shown in FIG. 4, the interlaced scanning method is characterized in that the picture being displayed (full picture) is decomposed into lines, such that the lines of this full picture are divided into two temporally sequential half pictures. The lines with an originally odd line number are displayed in the first half picture, and the lines with an originally even line number are displayed in the second half picture. The standard for displaying the picture is specified in the guideline ITU-R 601.

As shown in FIG. 4, the number of lines of each of the two half pictures is half the number of lines of the full picture. A vertical decimation factor (VDEC) can be defined for the interlaced scanning method. This factor corresponds to the ratio of the number of lines of the full picture to the number of lines of the half pictures. In the example of FIG. 4, the vertical decimation factor is two (2).

FIG. 4 also shows that a phase offset PHS exists between the lines of the first half picture and those of the second half picture. This phase offset amounts to one line. In general, the phase offset is calculated as follows:

$$PHS = \frac{VDEC}{2} \tag{1}$$

This phase offset must be taken into account at the beginning, when generating the second picture.

The preceding description assumes a vertical decimation factor VDEC that is constant over the full picture or the half picture. However, for certain applications and for displaying certain effects, it may be desirable to create digital pictures by the interlaced scanning method, with a vertical distortion that changes as a function of vertical position. For example, expansion or compression of a picture or the display of a vertical panorama effect requires a change of the vertical decimation factor or expansion factor over the picture. The vertical decimation factor VDEC thus becomes a function of the line of the half picture, i.e. VDEC=VDEC(L), where L designates the particular line of the half picture. For displaying other effects, it is also conceivable to make the vertical decimation factor also dependent on other parameters, for example the pixel position, et cetera. However, to calculate a phase correction factor for the second half picture, so as to take into account the phase offset between the second half picture and the first half picture, only the vertical decimation factor VDEC on the line is relevant. The following therefore holds for the phase offset:

$$PHS(1) = \frac{VDEC(1)}{2} \tag{2}$$

It is necessary to perform a phase correction for the second half picture, since otherwise an undesirable picture distortion, which is perceived as interference, occurs in the vertical direction during the course of the picture.

There is a need for a system and method of correcting the phase of a vertically distorted digital picture.

SUMMARY OF THE INVENTION

The phase correction signal for the second half picture is derived from a signal which contains information about the change of the vertical decimation factor of the second digital half picture. If the vertical decimation factor changes as a function of the line, the phase correction signal is determined for each individual line of the second half picture.

The phase correction vphscor can be determined in accordance with the following relation, where vinc(L) designates the vertical increment of the vertical decimation factor, i.e. the change of the vertical decimation factor in the vertical direction:

$$vphscor(1) = \frac{1}{2} \cdot vinc(1) \tag{3}$$

The circuit needed for the phase correction can be constructed of only two adders with feedback, one limiter, a multiplexer, and an additional adder.

The present invention can be used generally in the field of digital picture processing, especially in the field of digital television technology. A unit for picture processing with vertical picture distortion using the interlaced scanning method, based on the present invention, can be situated both before and after an appropriate picture memory. That is, the principle on which the present invention is based can be applied generally to a vertical distortion both before and after a picture memory.

These and other objects, features and advantages of the present invention will become more apparent in light of the following detailed description of preferred embodiments thereof, as illustrated in the accompanying drawings.

DESCRPTION OF THE DRAWINGS

DETAILED DESCRIPTION OF THE INVENTION

Figure 1:
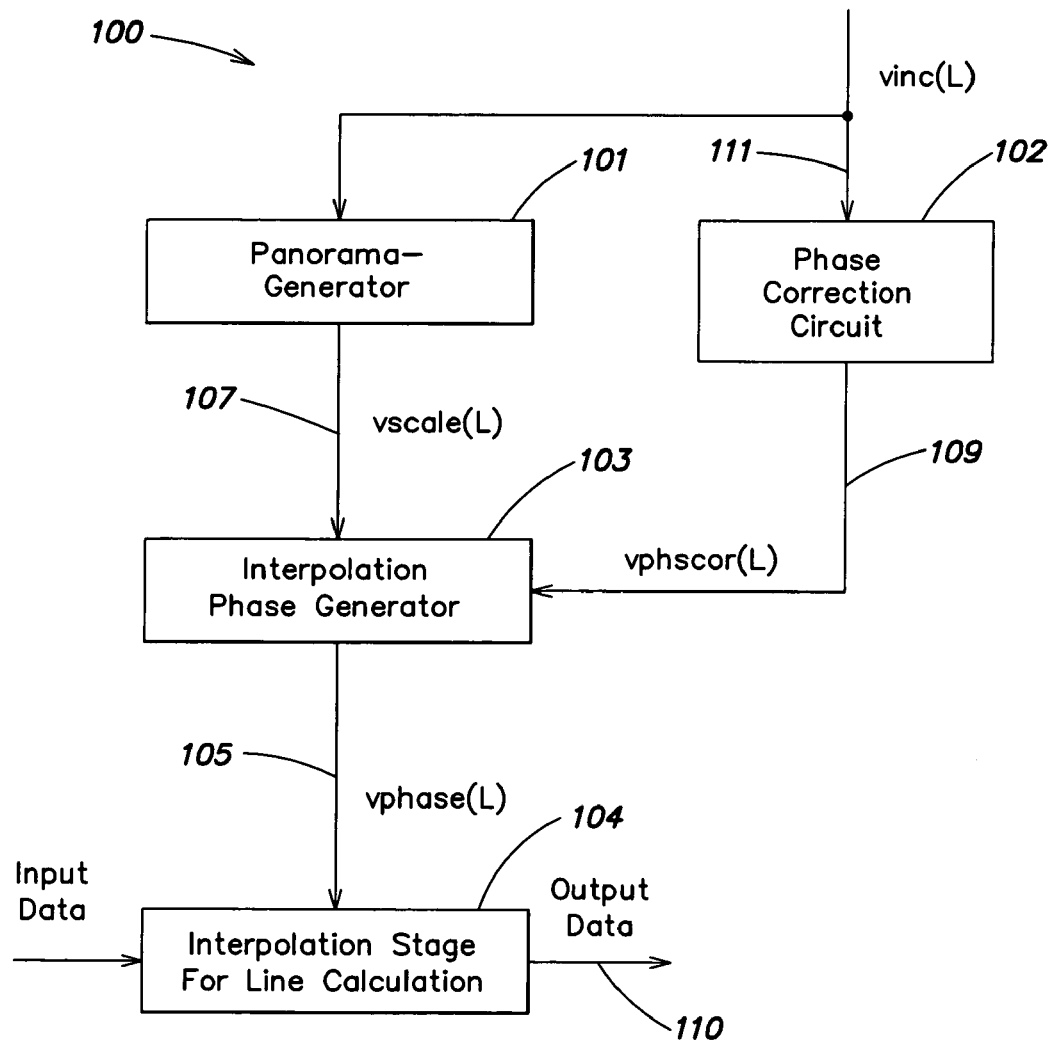
FIG. 1 is a simplified block circuit diagram illustration of a unit for vertical picture distortion.

FIG. 1 is a block diagram illustration of a digital signal processing unit 100. The unit 100 includes a panorama generator circuit section 101, an interpolation phase generator 103, and an interpolation phase generator section 102. The circuit sections 101–103 generate a phase correction signal vphase(L) on a line 105 for the second half picture of a digital full picture. The phase correction signal is input to an interpolation stage 104. In dependence on the phase correction signal vphase(L) on the line 105, which can also be designated as the vertical interpolation phase, the interpolation stage 104 calculates the decimated picture lines belonging to the digital picture data of a digital full picture, in accordance with the particular instantaneous value of the vertical decimation factor VDEC(L). The interpolation stage 104 outputs picture data on a line 110 corresponding to the decimated picture lines of the two half pictures of the digital full picture in the form of output data.

The signal vphase(L) on the line 105 designates the weighting between two original lines of the digital full picture, which is used by the interpolation stage 104 to calculate the decimated picture lines of the two digital half pictures and the corresponding digital picture data. The interpolation phase generator 103 calculates the vertical interpolation phase vphase(L) on the line 105 as a function of a vertical scale factor vscale(L) on a line 107, and of a vertical phase correction vphscor(L) on a line 109, which is generated by the phase correction circuit 102. The vertical scale factor vscale(L) on the line 107 is a measure of the vertical decimation factor VDEC(L). A vertical increment vinc(L) signal on line 111 is input to the panorama generator 101 and the phase correction circuit 102. This vertical increment describes the change of the vertical decimation factor (i.e., vinc(L)=0 if ΔVDEC(L)=0). The values and signals vinc(L), vscale(L), vphscor(L), and vphase(L) are each a function of the line L of the digital full picture and of the particular second digital half picture under consideration.

Figure 2:
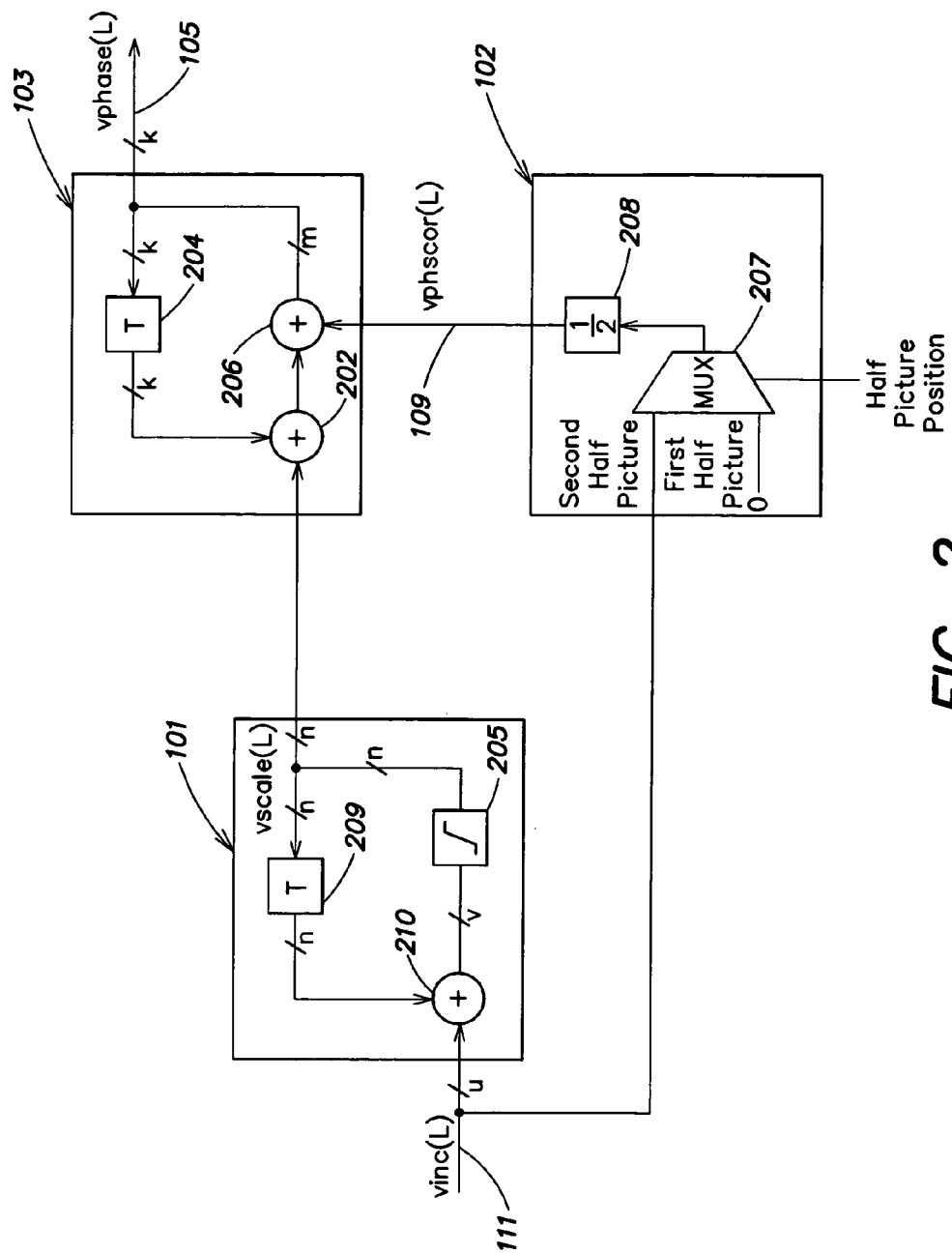
FIG. 2 is a more detailed illustration of several elements of the unit illustrated in FIG. 1.

FIG. 2 is a more detailed block diagram illustration of the panorama generator 101, the phase correction circuit 102 and the interpolation phase generator 103. The interpolation phase generator 103 includes a digital oscillator, which is formed by a first adder 202 that is fed back through a register 204. The reference symbols k and m designate the bit width of the data words transmitted within the interpolation phase generator 103. The interpolation phase generator 103 also includes a second adder 206, situated in its feedback path, and sums the output of the adder 202 and the vertical phase correction value vphscor(L) signal on the line 109, and the summed value is output on the line 105 as the signal vphase(L).

Without considering this vertical phase correction vphscor(L), the vertical decimation factor VDEC(L), as a function of the vertical scale factor vscale(L) of the interpolation phase generator 103, is defined as follows:

$$VDEC(1) = \frac{2^k + vscale(1)}{vscale(1)} \tag{4}$$

As with the phase correction for the second half picture with a constant vertical decimation factor, with a variable vertical decimation factor the phase must be corrected for each new value of the vertical interpolation phase vphase(L). The phase correction is calculated as follows:

$$vphscor(1) = \frac{1}{2} \cdot \frac{d}{dl} VDEC(1) \tag{5}$$

One thus obtains:

$$vphscor(1) = \frac{1}{2} \cdot \frac{d}{dl} vscale(1) \tag{6}$$

Here we assume the convention VDEC(L)=vscale(L). A mathematical simplification and approximation then yields:

$$vphscor(1) = \frac{1}{2} \cdot \Delta vscale(1) \tag{7}$$

If the vertical increment, as already described, is now described by the change of the vertical scale factor and of the vertical decimation factor, that is if:

$$vphscor(1) = \frac{1}{2} \cdot vinc(1) \tag{9}$$

the phase correction can be derived directly from the vertical increment, as follows:

$$vphscor(L) = \frac{1}{2} \cdot vinc(L) \tag{9}$$

The phase correction signal vphscor(L) for the second half picture can thus be derived directly from the increment vinc(L), which serves as the basis for the vertical scale factor vscale(L). The vertical scale factor vscale(L) serves as the control signal for generating the phase information vphase (L) for the interpolation by the interpolation stage 104. Due to the above relation set forth in EQ. (8), the following relation holds:

$$vscale(L) = vscale(L-1) + vinc(L) \tag{10}$$

or $$vinc(L) = vscale(L) - vscale(L-1) \tag{11}$$

The structure of an accumulator, shown in FIG. 2, thus results for the panorama generator 101, which generates the vertical scale factor vscale(L). In principle, this accumulator is formed by an adder 210, fed back through a register 209.

In addition, a limiter 205 is inserted into the feedback path, to prevent overflow of the register 209. The reference symbols n, u and v again designate the word width of the respectively transmitted data words.

As shown in FIG. 2, the vertical phase correction vphscor (L) can be obtained by the combination of a multiplexer 207 with an evaluator 208 and by adding the adder 206 to the phase generator 103. Information about the specific instantaneous half picture position (i.e., about the specific and continuously instantaneously processed half picture) is continuously conducted to the multiplexer 207. If, at this instant, the first half picture is involved, the adder 206, which has been added to the interpolation phase generator 103, is ineffective, since the multiplexer 207 outputs the value "0". On the other hand, for the second half picture, the value vinc(L)/2 is conducted to the adder 206 through the multiplexer 207 and the gain/evaluator 208. One half of the vertical increment vinc(L) is thus added to each phase value calculated by the adder 202 of the interpolation phase generator 103, so as to obtain the final phase vphase(L). The gain/evaluator 208 can be realized simply by a bit shift operation (i.e., shifting the bits of the data word vinc(L) by one place to the right or toward a less significant bit).

Figure 3A:
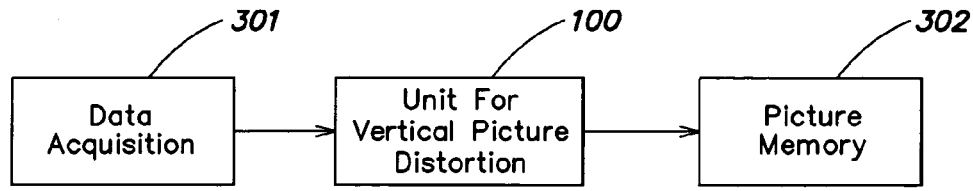
FIGS. 3A and 3B are block diagram illustrations of the arrangement of the units shown in FIG. 1, before and after a picture memory.
Figure 3B:
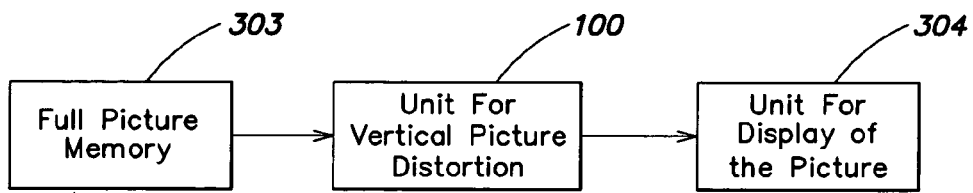
Figure 4:
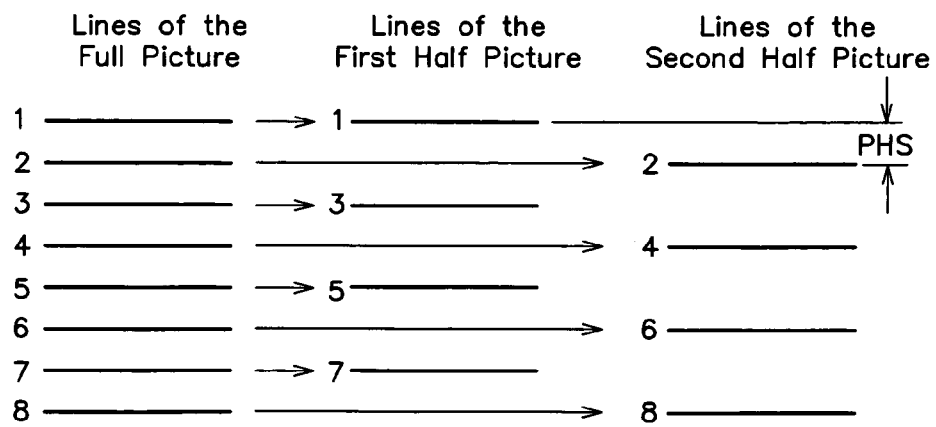
FIG. 4 is a pictorial illustration of the decomposition of a full picture into the lines of two interlaced half pictures.

As shown in FIGS. 3A and 3B, the unit for vertical picture distortion can be situated either before or after a picture memory. FIG. 3A shows a general diagram of an inventive unit 100 for vertical picture distortion by the interlaced scanning method in the acquisition path of an arrangement for digital video signal processing, in which the inventive unit 100 for vertical picture distortion is situated behind a data acquisition section 301 and before a picture memory 302. FIG. 3B shows a general diagram of the arrangement of an inventive unit 100 for vertical picture distortion by the interlaced scanning method in the display path of an arrangement for digital video signal processing, where the inventive unit 100 is situated after a full picture memory 303 and before a unit 304, which is used to display the picture by the interlaced scanning method.

Although the present invention has been shown and described with respect to several preferred embodiments thereof, various changes, omissions and additions to the form and detail thereof, may be made therein, without departing from the spirit and scope of the invention.

The invention claimed is:

1. A device for correcting the phase of a vertically distorted digital picture, comprising:
  a line determination device that receives picture data of a digital picture, and assigns lines of the digital picture to a first half picture and to a second half picture in accordance with an imaging factor, which changes in the vertical direction of the digital picture, such that the lines of the first half picture and the lines of the second half picture are displayed sequentially;
  a phase correction unit that generates a phase correction signal for the line determination device, such that the phase correction signal depends on the vertical position in the second half picture and is taken into account by the line determination device when generating the second half picture; where
  the phase correction unit derives the phase correction signal for the second half picture from an increment signal, which describes the change of the imaging factor in the vertical direction of the digital picture.

2. The device of claim 1, where the imaging factor changes as a function of the line in the vertical direction of the digital picture, and that the phase correction unit generates the phase correction signal anew for each line of the second half picture.

3. The device of claim 2, where the phase correction unit comprises
  a first circuit section to generate, in dependence on the increment signal, a control signal which determines the imaging factor;
  a second circuit section to generate the phase correction signal in dependence on the increment signal; and
  a third circuit section to generate a phase signal, which is conducted to the line determination device and corresponds to a phase offset between the first half picture and the second half picture, and which is generated in dependence on the control signal of the first circuit section and the phase correction signal of the second circuit section.

4. The device of claim 3, where the first circuit section comprises an adder, fed back through a register, and that the increment signal is conducted as an input signal to the adder.

5. The device of claim 4, comprising a limiter situated in the feedback path of the fed back adder of the first circuit section.

6. The device of claim 5, where the second circuit section comprises a multiplexer device and an evaluation device with the evaluation factor ½, such that the multiplexer device receives as its input signals the increment signal and the fixed value zero and is driven by a control signal which describes the half picture position, and such that the output signal of the multiplexer device is conducted, via the evaluation device, to the third circuit section.

7. The device of claim 6, where the third circuit section comprises an adder, fed back through a register, and that the input signal of this adder is the control signal which determines the imaging factor and which is generated by the first circuit section, and that another adder is situated in the feedback path of the fed back adder, and that the output signal of the evaluation device of the second circuit section is conducted, as the phase correction signal, to the further adder.

8. A device for correcting the phase of a vertically distorted digital picture, comprising:
  means, for receiving picture data and a vertical phase correction signal, and for assigning lines of the digital picture to a first half picture and to a second half picture, such that the lines of the second half picture are phase corrected with respect to the first half picture and the first and second half pictures are displayed sequentially; and
  means, responsive to an increment signal that describes the change of an imaging factor in the vertical direction of the digital picture on a line-by-line basis, for generating the phase correction signal.

9. The device of claim 8, where the means for generating the phase correction signal comprises:
  a phase correction unit that receives the increment signal and provides a vertical phase correction signal;
  a panorama generator that receives the increment signal and provides a vertical scale factor signal; and
  an interpolation phase generator the receives the vertical phase correction signal and the vertical scale factor signal, and provides the phase correction signal.

10. The device of claim 9, where the phase correction unit sets the vertical phase correction signal to zero when the picture data associated with the first half picture is being provided by the means for assigning.

11. The device of claim 8, wherein the means for generating the phase correction signal generates a phase correction signal for each line of the second half picture.

12. The device of claim 9, where the panorama generator comprises:
  a first summer that receives and sums the increment signal and a first feedback signal to provide a first summed signal;
  a limiter that receives the first summed signal and provides the vertical scale factor signal; and
  a first delay element that receives the vertical scale factor signal and provides the first feedback signal.

13. The device of claim 9, where the interpolation phase generator comprises:
  a second summer that receives and sums (i) the vertical scale factor, (ii) a past value of the phase correction signal and (iii) a vertical phase correction signal to provide the phase correction signal; and a second delay element that receives the phase correction signal and provides the past value of the phase correction signal.

14. The device of claim 9, where the phase correction unit sets the vertical phase correction signal value as a fraction of the increment signal when picture data associated with the second half picture is being provided, and sets the vertical phase correction signal to zero when picture data associated with the first half picture is being provided.

15. A device for correcting the phase of a vertically distorted digital picture, comprising:
   means, for receiving picture data and a vertical phase correction signal, and for assigning lines of the digital picture to a first half picture and to a second half picture, such that the lines of the second half picture are phase corrected with respect to the first half picture and the first and second half pictures are displayed sequentially; and
   means, responsive to (i) an increment signal that describes the change of an imaging factor in the vertical direction of the digital picture on a line-by-line basis and to (ii) a picture position signal indicative of whether the first half picture or the second half picture is being output, for generating the phase correction signal.

16. The device of claim 15, where the means for generating the phase correction signal comprises:
   a phase correction unit that receives the increment signal and provides a vertical phase correction signal;
   a panorama generator that receives the increment signal and provides a vertical scale factor signal; and
   an interpolation phase generator that receives the vertical phase correction signal and the vertical scale factor signal, and provides the phase correction signal.

17. The device of claim 16, wherein the means for generating the phase correction signal generates a phase correction signal for each line of the second half picture.

18. The device of claim 17, where the phase correction unit sets the vertical phase correction signal value as a fraction of the increment signal when picture data associated with the second half picture is being provided, and sets the vertical phase correction signal to zero when picture data associated with the first half picture is being provided.

* * * * *

UNITED STATES PATENT AND TRADEMARK OFFICE
CERTIFICATE OF CORRECTION

PATENT NO. : 7,095,446 B2
APPLICATION NO. : 10/048730
DATED : August 22, 2006
INVENTOR(S) : Hahn et al.

It is certified that error appears in the above-identified patent and that said Letters Patent is hereby corrected as shown below:

Title Page, Item (54) & Column 1, Line 1-3
Delete "METHOD AND DEVICE FOR PHASE CORRECTION OF A VERTICALLY DISTORTED DIGITAL IMAGE" and insert --DEVICE FOR CORRECTING THE PHASE OF A VERTICALLY DISTORTED DIGITAL PICTURE--

In the Abstract
Line 9, delete "veritcal" and insert --vertical--

Column 2

In equation 2, delete " $PHS(1) = \dfrac{VDEC(1)}{2}$ " and insert -- $PHS(L) = \dfrac{VDEC(L)}{2}$ --

In equation 3, delete " $vphscor(1) = \dfrac{1}{2} \bullet vinc(1)$ " and insert -- $vphscor(L) = \dfrac{1}{2} \bullet vinc(L)$ --

Column 3

In equation 4, delete " $VDEC(1) = \dfrac{2^k + vscale(1)}{vscale(1)}$ " and insert -- $VDEC(L) = \dfrac{2^k + vscale(L)}{vscale(L)}$ --

Column 4

In equation 5, delete " $vphscor(1) = \dfrac{1}{2} \bullet \dfrac{d}{dL} VDEC(1)$ " and insert -- $vphscor(L) = \dfrac{1}{2} \bullet \dfrac{d}{dL} VDEC(L)$ --

UNITED STATES PATENT AND TRADEMARK OFFICE
CERTIFICATE OF CORRECTION

PATENT NO. : 7,095,446 B2  
APPLICATION NO. : 10/048730  
DATED : August 22, 2006  
INVENTOR(S) : Hahn et al.

It is certified that error appears in the above-identified patent and that said Letters Patent is hereby corrected as shown below:

In equation 6, delete " $vphscor(1) = \frac{1}{2} \cdot \frac{d}{dL} vscale(1)$ " and insert -- $vphscor(L) = \frac{1}{2} \cdot \frac{d}{dL} vscale(L)$ --

In equation 7, delete " $vphscor(1) = \frac{1}{2} \cdot \Delta vscale(1)$ " and insert -- $vphscor(L) = \frac{1}{2} \cdot \Delta vscale(L)$ --

In equation 9, line 25, delete " $vphscor(1) = \frac{1}{2} \cdot vinc(1)$ " and insert -- $vinc(L) = \Delta vscale(L)$ --

Line 27, delete "(9)" and insert --(8)--

Column 5  
Line 51, after "and" delete "that"  
Line 55, after "comprises" insert -- : --

Signed and Sealed this

Fourteenth Day of November, 2006

JON W. DUDAS  
*Director of the United States Patent and Trademark Office*